United States Patent [19]

Lentz

[11] Patent Number: 4,867,000
[45] Date of Patent: Sep. 19, 1989

[54] LINEAR MOTION POWER CYLINDER

[76] Inventor: Dennis G. Lentz, 2006 Briarwood Ct., Eau Claire, Wis. 54703

[21] Appl. No.: 262,276

[22] Filed: Oct. 25, 1988

Related U.S. Application Data

[63] Continuation of Ser. No. 929,264, Nov. 10, 1986, abandoned.

[51] Int. Cl.$^4$ .............................................. F16H 25/20
[52] U.S. Cl. .............................. 74/89.15; 74/424.8 R; 254/93 A
[58] Field of Search ........................ 74/89.15, 424.8 R; 254/93 A

[56] References Cited

U.S. PATENT DOCUMENTS

| 2,307,317 | 1/1943 | König | 74/424.8 R |
|---|---|---|---|
| 2,444,886 | 7/1948 | Vickers | 74/424.8 R |
| 2,869,403 | 1/1959 | Bent | 74/424.8 R |
| 2,966,070 | 12/1960 | Wise | 74/424.8 R |
| 3,090,360 | 5/1963 | Bennett et al. | 74/424.8 R |
| 3,499,344 | 5/1968 | Pickles | 74/424.8 R |
| 4,295,384 | 10/1981 | Brandt et al. | 74/89.15 |
| 4,553,056 | 11/1985 | Pfister | 74/89.15 |

FOREIGN PATENT DOCUMENTS 0031757 2/1986 Japan .................................. 74/89.15

OTHER PUBLICATIONS

"Industrial Hydraulic Technology"; Parker Fluid Power Bulletin #0221-B1; 19th Printing (Jan. 1985); pp. 12-12 to 12-13.

Primary Examiner—Leslie A. Braun
Assistant Examiner—Scott Anchell
Attorney, Agent, or Firm—Moore & Hansen

[57] ABSTRACT

A linear motion power cylinder utilizing a rotor with radially movable impeller vanes rotatably mounted within a cylinder having an eccentric bore, the chamber created between the rotor and cylinder being accessible by two ports, with one port located adjacent to each end of the cylinder. Fluid pressure within the chamber imparts a force on the impeller vanes which in turn drives the rotor. The rotation of the rotor is transferred through a system of planetary gears to a power screw which passes through the center of the rotor. This rotary motion is translated into linear motion by a threaded cylinder rod threadedly engaged with the power screw. The cylinder rod may be moved reciprocally in and out of the linear motion power cylinder increments by reversing the direction of the fluid flow into the cylinder chamber.

16 Claims, 3 Drawing Sheets

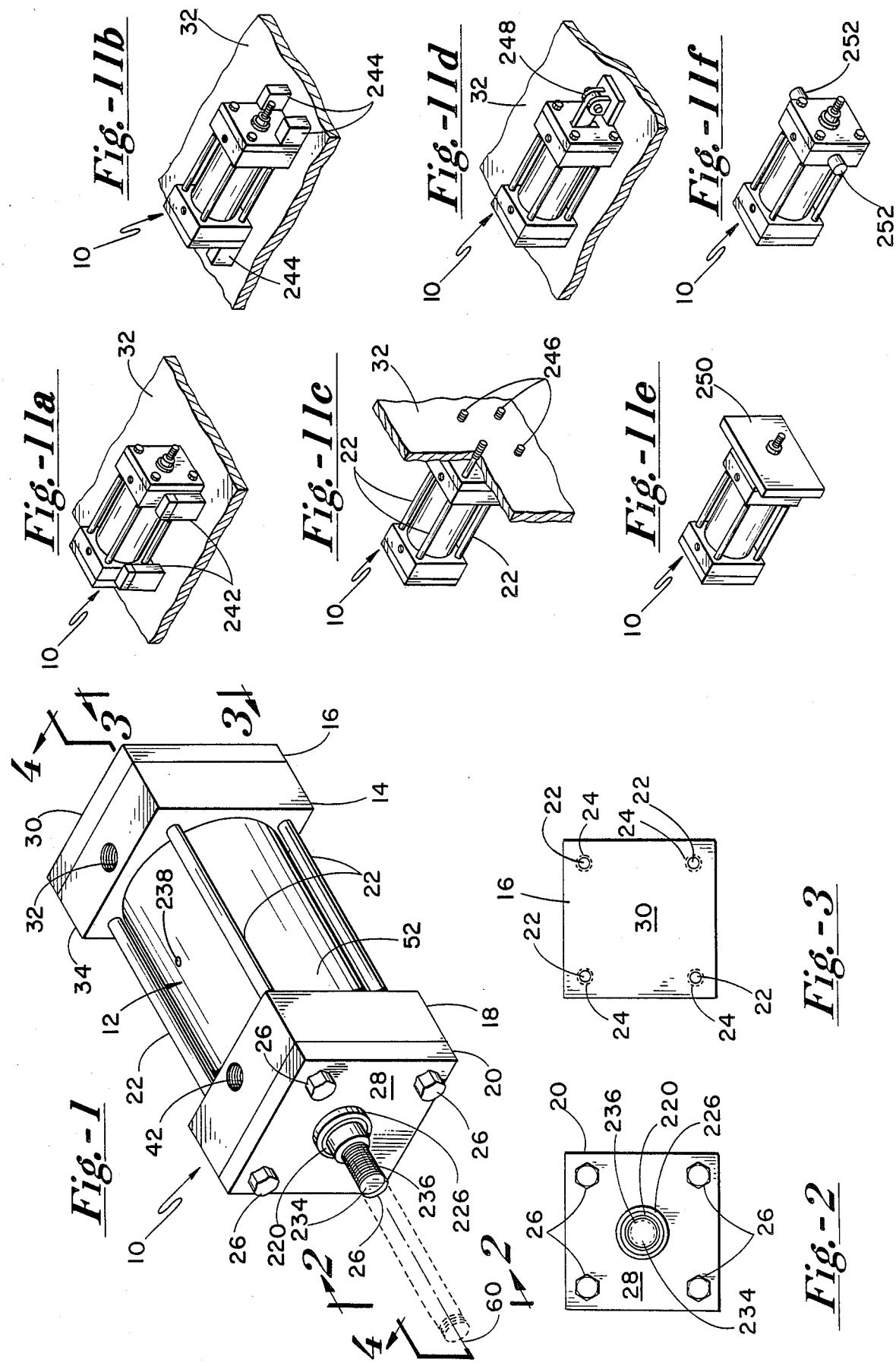

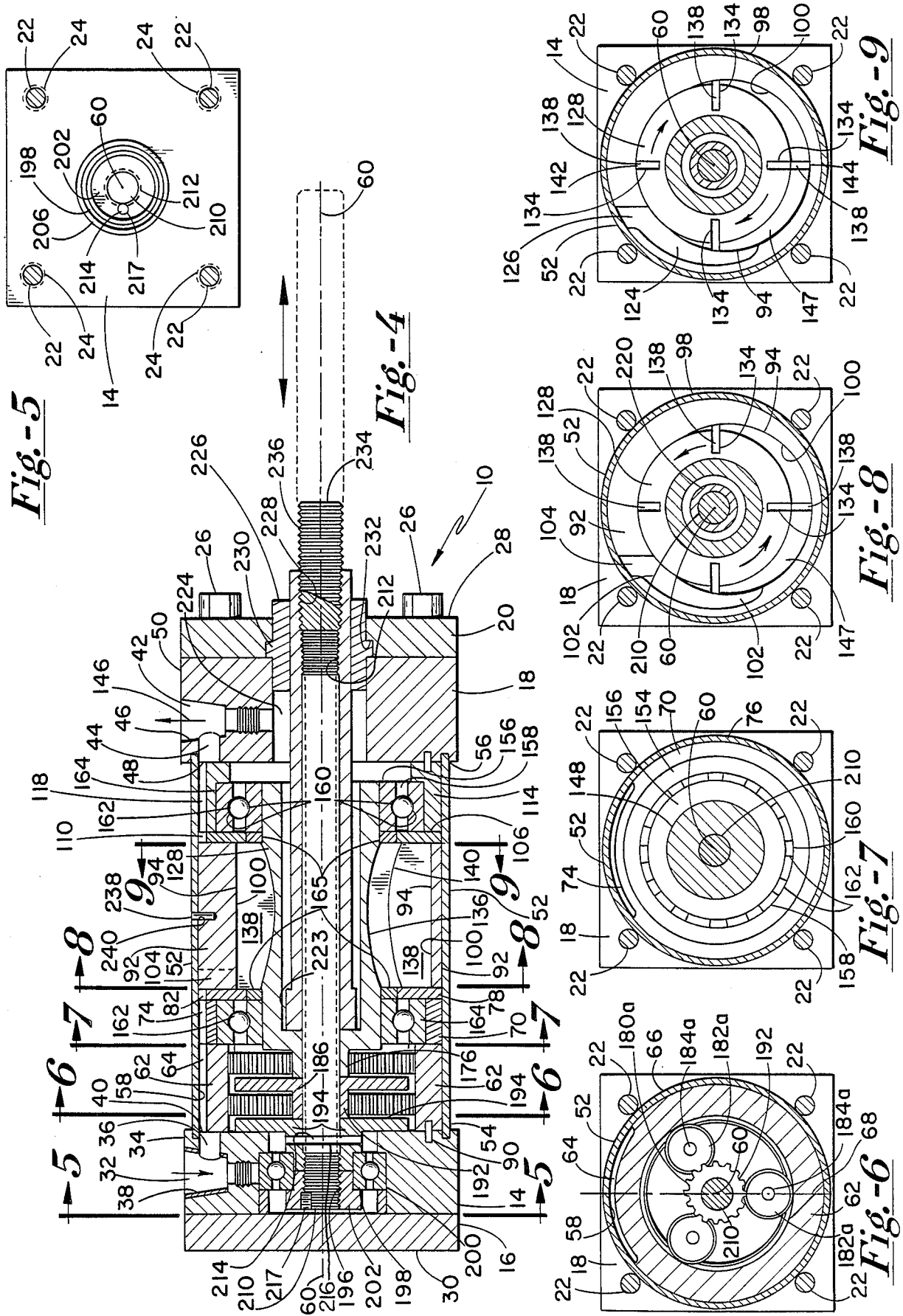

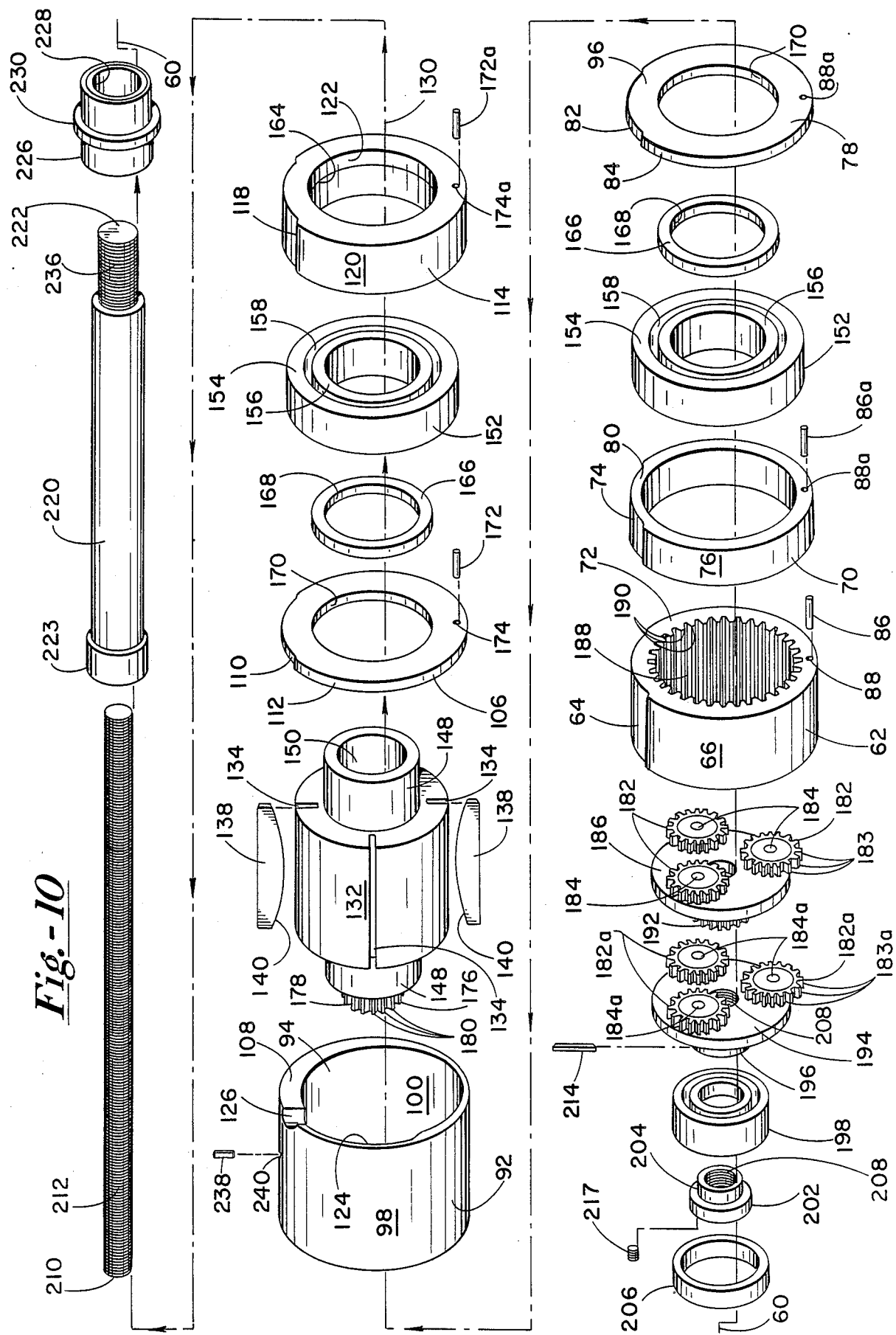

LINEAR MOTION POWER CYLINDER

This is a continuation of application Ser. No. 06/929,264, filed Nov. 10, 1986.

BACKGROUND OF THE INVENTION

This invention relates to devices for converting rotary motion to reciprocatory linear motion, and in particular to a device for using pneumatic or fluid pressure to produce said rotary motion, which in turn controls the incremental linear motion of a shaft.

Devices for converting rotary to linear motion and linear to rotary motion are well known. Several piston and crank configurations exist which translate either type of motion to its relative counterpart, and examples of machines using such a piston and crank—the internal combustion engine, steam locomotive, and sewing machine for example—are commonplace. Another design incorporates a screw shaft, in which the rotary motion of a fixed screw causes the linear movement of a screw shaft meshed with that fixed screw—the principle used in a log splitter or lathe. The rack and pinion is another simple device to connect the rotary motion of a pinion having gear teeth to the linear motion of a straight rack having corresponding gear teeth meshed with those of the pinion, as in a drill press or mechanical tuner.

Many systems use varying combinations of these simpler devices, or elements selected from those devices and assembled in more complex arrangements, to achieve the specific results required for a particular application. U.S. Pat. No. 4,436,163 discloses a mechanism for use in a power operated tool such as a jigsaw wherein the rotary motion produced by a motor is transferred to an output shaft and pinion which in turn meshes with a gear mounted on a second shaft connected to a crank disc. The crank disc has a bore to contain the ball-shaped head of an inclinable link that transmits the rotary motion of the crank disc to a reciprocating piston member.

While this mechanism displays one method of minimizing the torque exerted about the axis of the piston in a crank and piston arrangement that is being used to translate rotary to linear motion, it also serves to identify several of the drawbacks to crank and piston systems.

First, in order to operate efficiently and utilize a minimum of components, the axis of rotation of the crank and the linear path of the piston must be oriented in two different physical dimensions. Second, the movement of the piston may best be defined by the equations for a simple harmonic oscillator, and are therefore mathematically 'nonlinear' in the sense that a unit change in the angle of the crank less than one half revolution will not produce a uniform change in the displacement of the piston. Third, the crank and piston arrangement is best applied in situations requiring rapid oscillation of the piston throughout a continuous circuit, rather than incremental movements of the piston in a random or alternating sequence of directions along its path. Fourth, obtaining an increase in the stroke length of the piston requires a corresponding increase in the radius of the crank disc which necessitates a physical alteration in the mechanical connection between the crank and piston. Fifth, if an alteration in the speed or power of the piston stroke is required, the crank speed must be changed by varying the motor speed or incorporating a mechanism such as a clutch to alter the gear ratio, thus requiring additional components and consuming increasingly larger volumes of space. Even with such modifications, it is difficult to attain instantaneous, alternating, or well defined changes in speed or power with such a system.

U.S. Pat. No. 4,489,792 discloses an adapter for a power drill designed to convert the rotational motion of the drill chuck into reciprocatory motion in order to produce a rotary drive, an impact force, or a combination of each. The device utilizes a fixed mode cam and a displaceable floating cam located in a housing between the drill motor and the chuck, and includes a rotating dial to select the desired output forces.

Although being relatively compact, providing mathematically 'linear' motion in one direction, and aligning the axis of rotation of the rotary motion along the path of the linear motion, this device points out several drawbacks incumbent with cam-type systems.

First, the linear motion is again suitable only for rapid oscillations over a short stroke length, and cannot be used to provide incremental movement in a selected direction. Second, the reciprocatory motion is controlled by the motor in only one direction, and depends upon a recoil spring or hand pressure exerted by the user to complete each circuit and return the piston to its original position. Third, the source of the rotary motion—in this case the motor and rotary drive shaft—is displaced relative to the path of the linear motion.

U.S. Pat. No. 3,323,160 discloses a surface treating device designed to accomplish results analogous to those of the previous device, yet capable of correspondingly slower oscillations with a comparatively heavier load, by using a variation of the piston and crank discussed previously.

U.S. Pat. No. 3,323,382 discloses a precision linear actuator of a type now commonly referred to as a digital linear actuator. These actuators use an electric stepper motor with an internally threaded rotor coupled to a correspondingly threaded lead screw shaft, so that by energizing the coils of the stepper motor in the proper sequence the threaded shaft may be moved outward or inward relative to the rotor.

Such actuators may be used to position the path of linear motion of the shaft in increments along a region overlapping and contiguous with the axis of rotation of the rotary motion. However, because they require electric motors to provide their drive power, and a complex array of electronic circuitry to time the energizing of the coils and control the incremental movement of the shaft, these actuators are not suitable for use in those existing systems which have pneumatic or fluid control mechanisms and utilize cylinders driven by pneumatic or fluid pressure to obtain the desired linear motion. Although these fluid power cylinders lack the accurate control over the incremental linear movement which may be attained with digital linear actuators—because the pressurized gases or fluids remain compressible to some degree, are subject to temperature fluctuations over extended time periods, and conform to somewhat variable relationships relating the pressure and volume of the fluid to the linear displacement of the cylinder piston—they continue to be instrumental components in many systems because the physical dimensions of the cylinders and the expense or complexity of replacing the control systems mitigate against adopting a precision linear actuator.

The pneumatic or fluid cylinders described above which translate fluid pressure directly into linear motion of a rod may be categorized in several ways: singleacting, cushioned, double-acting, ram, spring return, threaded head, double-end rod, telescoping, multiposition, diaphragm, rotating, slotted, or rodless. Because of their many applications, a uniform system of dimensions, design specifications, and standards has been established to govern these cylinders through the National Fluid Power Association (NFPA). Consequently, engineers may rely upon the interchangability and compatibility of various fluid cylinders which are produced in accordance with the NFPA guidelines.

U.S. Pat. No. 4,592,430 discloses a power tool for anchoring threaded fasteners which is capable of delivering reversible rotary motion and is driven by fluid pressure. The tool utilizes an eccentric cylinder and floating vane configuration found in pumps and fluid motors, but produces only rotary motion which is subsequently transferred to a drive shaft and bit holder.

This device displays the inordinately complex array of control elements which must be incorporated into a reversible valve mechanism for such a fluid operated tool, without including any elements to translate the rotary motion of the shaft into linear motion.

One other known device to convert linear motion produced by pressure into rotary motion, in which the linear motion is reciprocating and in which the rotating shaft is, at times, received within the reciprocating housing, is the "dixie drill." The dixie drill, however, cannot effectively convert rotational motion to distinct and incremental linear motion, and is not adapted for use with pneumatic or fluid pressure systems.

BRIEF SUMMARY OF THE INVENTION

Therefore, it is one object of this invention to design a device for translating rotary motion into linear motion wherein the axis of rotation of the rotary motion and the path of the linear motion are confined to the same linear direction of extent and within a contiguous region.

Another object of this invention is to design the above device such that a mathematically 'linear' relationship exists between a unitary change in the angle of rotation of the rotary motion and the equivalent change in the distance and direction of displacement along the path of the linear motion.

A further object of this invention is to design the above device such that it is capable of producing both incremental linear movement in a selected direction and simple oscillatory motion.

Still another object of this invention is to design the above device such that a variable piston stroke length or shaft displacement may be achieved without increasing the volume of the mechanism or altering the physical connection to piston or shaft.

A further object of this invention is to design the above device with completely complimentary and suitable dimensions, fittings, and control parameters such that it may be incorporated directly into, or used as a replacement for, standard NFPA cylinders in existing pneumatic or fluid controlled and pressurized systems.

Yet another object of this invention is to design the above device such that instantaneous, alternating, and well defined changes in the speed or power of linear movement of the shaft may be attained, and either rapid or slow speed oscillations selected, by operation of the existing control apparatus, and without modification of the structure of the device itself.

Briefly described, the linear motion power cylinder of this invention is characterized by a rotor utilizing radially movable impeller vanes rotatably mounted within a cylinder having an eccentric bore, the chamber created between the rotor and cylinder being accessible by two ports, one port being located adjacent to each end of the cylinder. Fluid pressure within the chamber imparts a force on the impeller vanes which in turn drives the rotor. The rotation of the rotor is transferred through a system of planetary gears to a power screw which passes through the center of the rotor. This rotary motion is translated into linear motion by a threaded cylinder rod surrounding the power screw. The cylinder rod may be moved reciprocally in and out of the linear motion power cylinder in discrete increments by reversing the direction of the fluid flow into the cylinder chamber.

In particular, the above linear motion power cylinder mechanism is designed to fit within the dimensional envelope of the National Fluid Power Association's (NFPA) cylinder standards, but is not limited to the NFPA cylinder dimensional standards. Thus, the linear motion power cylinder may be mounted in any NFPA dimensionally interchangeable housing, using the appropriate mounting method.

These and other objects and advantages of the invention will be readily understood as the following description is read in conjunction with the accompanying drawings, wherein like reference numerals designate like elements throughout the several views.

BRIEF DESCRIPTION OF THE DRAWINGS

FIG. 1 is a perspective view of the linear motion power cylinder of this invention;

FIG. 2 is an elevation view of the back of the linear motion power cylinder of FIG. 1;

FIG. 3 is an elevation view of the front of the linear motion power cylinder of FIG. 1;

FIG. 4 is a longitudinal section view of the linear motion power cylinder taken through line 4—4 of FIG. 1;

FIG. 5 is a transverse section view of the linear motion power cylinder taken through line 5—5 of FIG. 4;

FIG. 6 is a transverse section view of the linear motion power cylinder taken through line 6—6 of FIG. 4;

FIG. 7 is a transverse section view of the linear motion power cylinder taken through line 7—7 of FIG. 4;

FIG. 8 is a transverse section view of the linear motion power cylinder taken through line 8—8 of FIG. 4;

FIG. 9 is a transverse section view of the linear motion power cylinder taken through line 9—9 of FIG. 4;

FIG. 10 is an exploded view of the cylinder and rotor components of the linear motion power cylinder of FIG. 1;

FIG. 11a is a perspective view of the linear motion power cylinder mounted to planar surface using centerline lug mounts;

FIG. 11b is a perspective view of the linear motion power cylinder mounted to planar surface using foot mounts;

FIG. 11c is a perspective view of the linear motion power cylinder mounted to planar surface using tie-rod mounts;

FIG. 11d is a perspective view of the linear motion power cylinder mounted to planar surface using a clevis mount;

FIG. 11e is a perspective view of the linear motion power cylinder with a flange mount attached; and FIG. 11f is a perspective view of the linear motion power cylinder with trunnion mounts attached.

DESCRIPTION OF THE PREFERRED EMBODIMENTS

The linear motion power cylinder of this invention is shown in FIGS. 1-11 and referenced generally by the numeral 10.

Referring to FIG. 1, the linear motion power cylinder 10 has a central cylindrical portion 12 situated between a back cap 14 and back cap plate 16 on one side and a head cap 18 and head cap plate 20 on the other side. The linear motion power cylinder is held together by four tie-rods 2 which extend longitudinally through tie-rod holes 24 in the corners of the back cap plate 16, back cap 14, head cap 18 and head cap plate 20, respectively, and which surround the central cylindrical portion 12. The tie-rods 22 have hex-heads 26 or hex-nuts at their head cap plate end 28, and are threaded at the back cap plate end 30 to screw directly into corresponding threads in the tie-rod holes 24 in the back cap plate 20. This tie-rod arrangement represents the most common configuration for securing the elements of a standard pneumatic or fluid pressure cylinder.

The dimensions of the linear motion power cylinder 10 comply with the standards and specifications set forth by the National Fluid Power Association, and permit the linear motion power cylinder 10 to be compatibly interchanged with existing pneumatic or fluid pressure cylinders complying with those guidelines, and may be used with gas or liquid power fluids.

Referring now to FIG. 4, the head cap plate 20 and back cap plate 16 are situated at each of the respective ends 28, 30 of the linear motion power cylinder 10, the head cap 18 shown on the right side and the back cap 14 shown on the left side as viewed in FIG. 4. Adjacent to the head cap plate 20 is the head cap 18, and adjacent to the back cap plate 16 is the back cap 14, each cap 18, 14 and cap plate 20, 16 having the same size rectangular perimeter. Each cap 18, 14 and the head cap plate 20 have overlapping and cooperating tie-rod holes 24 extending entirely through, and the back cap plate 16 has tie-rod holes 24 partially through, the surfaces thereof into which the tie rods 22 are inserted.

As may best be seen by reference to FIG. 4, the back cap 14 has a first port 32 extending through the outer surface 34 thereof and which is threaded to accept a fluid pressure hose (not shown) having compatible threads. A first flow passage 36 extends from the internal wall 38 of the first port 32 through the medial face 40 of the back cap 14 toward the central cylindrical portion 12 and head cap 18. The first port 32 and first flow passage 36 form a continuous fluid path between the outer surface 34 and medial face 40 of the back cap 14.

The head cap has a second port 42 similarly threaded to accept a fluid pressure hose (not shown), and a second flow passage 44 extending from the internal wall 46 of the second port 42 through the medial face 48 of the head cap 18 toward the central cylindrical portion 12 and back cap 14. The second port 42 and the second flow passage 44 form a continuous fluid path between the outer surface 50 and medial face 48 of the head cap 18.

Extending longitudinally between the back cap 14 and head cap 18 is a cylindrical shell 52, one end of which fits into a first circular groove 54 in the medial face 40 of the back cap 14, the other of end which fits into a second circular groove 56 in the medial face 48 of the head cap 18. The inside diameter of the cylindrical shell 52 is such that the inner wall 58 of the cylindrical shell 52 is flush with the outermost edge of the first and second flow passages 36, 44. The cylindrical shell 52 and linear motion power cylinder 10 have a common longitudinal axis 60.

Referring to FIGS. 4, 6, and 10, an internal gear housing 62 in the form of a wide annular ring is centered about the longitudinal axis 60 adjacent to and contacting the medial face 40 of the back cap 14. A recess 64 in the outer surface 66 of the internal gear housing 62 extends along the portion of that outer surface 66 adjacent to the first flow passage 36 in the back cap 14 approximately 40 degrees to each side of a vertical line 68 extending through the longitudinal axis 60, as shown in FIG. 6. The depth of the recess 64 is approximately one-half or less than the diameter of the first flow passage 36.

A bearing sleeve 70 in the form of an annular ring thinner than the internal gear housing 62 is centered about the longitudinal axis 60 adjacent to and contacting the medial face 72 of the internal gear housing 62. The first bearing sleeve 70 has a recess 74 in the outer surface 76 of the bearing sleeve 70 adjacent to and in fluid communication with, and having the same width and depth dimensions as, the recess 64 in the internal gear housing 62.

An end plate 78 in the form of an annular disc is centered about the longitudinal axis 60 adjacent to and contacting the medial face 80 of the bearing sleeve 70. The end plate 78 has a recess 82 in the outer surface 84 of the end plate 78 adjacent to and in fluid communication with, and having the same width and depth dimensions as, the recess 74 in the bearing sleeve 70.

The end plate 78, bearing sleeve 70, and internal gear housing 62 are held in position with their respective recesses 82, 74, 64 aligned by two pins 86, 86a which are inserted longitudinally into alignment holes 88, 88a in the end plate 78, bearing sleeve 70, and internal gear housing 62 opposite the recesses 82, 74, 64. A similar pin 90 is inserted between the back cap 14 and internal gear housing 62 to align the recess 64 in the internal gear housing 62 with the flow passage 36 in the back cap 14.

An eccentric cylinder 92, having a cylinder bore 94 with a circular cross section off-centered from the longitudinal axis 60, is positioned adjacent to and contacting the medial face 96 of the end plate 78. As shown in FIG. 8, the cylinder bore 94 is centered below the longitudinal axis 60, and consequently the thickness of the eccentric cylinder 92 is greater at the top of the cylinder 92 than at the bottom. The outer surface 98 of the eccentric cylinder 92 contacts the inner surface 58 of the cylindrical shell 52 around the entire perimeter of the eccentric cylinder 92, and forms a fluid-tight seal therewith.

The interior surface 100 of the eccentric cylinder 92 has a cylinder recess 102 which extends longitudinally into the interior surface 100 a short distance, and arcuately from a point along the interior surface 100 approximately 35 degrees counterclockwise from the vertical line 68 to approximately 120 degrees counterclockwise from the vertical line 68 as shown in FIG. 8. A cylinder port 104 at the top end of the cylinder recess 102 extends through the side of the eccentric cylinder 92 from the outer surface 98 to the interior surface 100, to communicate with the recess 82 in the end plate 78 and form a passage between the recess 82 in the end plate 78 and the interior portion of the eccentric cylinder 92.

A second end plate 106 in the form of an annular disc is centered about the longitudinal axis 60 adjacent to and contacting the head face 108 of the eccentric cylinder 92. The second end plate 106 has a recess 110 in the outer surface 112 of the second end plate 106 having the same width and depth dimensions, and the same orientation, as the recesses 82, 74, 64 in the internal gear housing 62, bearing sleeve 70, and end plate 78, respectively.

A bearing housing 114 in the form of an annular ring thinner than the internal gear housing 62 yet wider than the bearing sleeve 70 is centered about the longitudinal axis 60 adjacent to and contacting the head face 116 of the second end plate 106. The bearing housing 114 has a recess 118 in the outer surface 120 of the bearing housing 114 adjacent to and in fluid communication with, and having the same width and depth dimensions as, the recess 110 in the second end plate 106. The bearing housing 114 has a side wall 122 which extends radially inward from the outer surface 120 of the bearing housing 114 adjacent to the head cap 18 to a point below the second flow passage 44.

The interior surface 100 of the eccentric cylinder 92 has a second cylinder recess 124 which extends longitudinally into the interior surface 100 a short distance, and arcuately from a point along the interior surface 100 approximately 35 degress counterclockwise from the vertical line 68 to approximately 120 degress counterclockwise from the vertical line 68 as shown in FIG. 9. The second cylinder recess 124 is positioned on the opposite side of the eccentric cylinder 92 from the first cylindrical recess 102 relative to a plane defined by the vertical line 68 and the longitudinal axis 60. A second cylinder port 126 at the top end of the cylinder recess 124 extends through the side of the eccentric cylinder 92 from the outer surface 98 to the interior surface 100, to communicate with the recess 110 in the second end plate 106 and the interior portion of the eccentric cylinder 92. The second cylinder recess 124 and second cylinder port 126 are located on opposite sides of the eccentric cylinder 92 from the cylinder recess 102 and cylinder port 104 in relation to the vertical line 68 passing through the longitudinal axis 60.

A rotor 128, which has as its axis of rotation 130 the longitudinal axis 60, is mounted within the eccentric cylinder 92 and aligned with the head end 108 of the eccentric cylinder 92. The central portion 132 of the rotor 128 has a length equal to the length of the eccentric cylinder 92 and a maximum radius slightly less than or equal to the distance between the longitudinal axis 60 and the topmost point 142 of the inside surface 100 of the eccentric cylinder 92 where that inside surface 100 intersects the vertical line 68. Four slots 134 having equal depth and arcuate bottom surfaces 136 are spaced apart at 90 degree intervals around the central portion 132 of the rotor 128 as shown in FIGS. 8 and 9. Each slot 134 extends the length of the central portion 132 of the rotor 128 as shown in FIGS. 4 and 9.

A vane 138 as wide and as long as each slot 134, and having a curved base 140 corresponding to the curvature in the bottom 136 of each slot 134, is slidably received within each slot 134. When a vane 138 is entirely inserted within a slot 134, the outermost surface of that vane 140 is flush with the surface of the central portion 132 of the rotor 128. The rotor 128 rotates, having the longitudinal axis 60 as its axis of rotation. The vanes 138 slide within the slots 134, forced outward by centrifugal force from the moving rotor 128, and restrained by centripetal force of the eccentric cylinder 92. Because the rotor 128 is nearest the inside surface 100 of the eccentric cylinder 92 at the topmost point 142 of the eccentric cylinder 92 (as viewed in FIGS. 4, 8, and 9), each vane 138 is received within its respective slot 134 the greatest distance when the vane 138 passes the topmost point 142. Conversely, the vane 138 is received within its respective slot 134 the least distance when the vane 138 passes the point 144 opposite the topmost point 142. The vanes 138 therefore travel in an elliptical or oblate path, reaching perigee with respect to the longitudinal axis 60 as they pass the topmost point 142, and apogee as they pass the point 144 opposite the topmost point 142. These Vanes 138 serve as impeller mechanisms for the rotor 128.

The first flow passage 36, recesses 64, 74, 82, cylinder port 104 and cylinder recess 102, eccentric cylinder 92, second cylinder recess 124 and second cylinder port 126, recesses 110, 118, and second flow passage 44 fluidly communicate to form a channel 146 leading from the first port 32 in the back cap 14 to the second port 42 in the head cap 18 as shown by the arrows in FIG. 4.

The vanes 138, rotor 128, and eccentric cylinder 92 form one or more fluid chambers or compartments 147. Fluid entering the first port 32 under pressure passes through the channel 146 and into the space between the eccentric cylinder 92 and the rotor 128, a portion of the fluid being dispersed between at least two of the vanes 134 carried by the rotor 128, and therefore being within one of the fluid chambers or compartments 147. The pressure of the fluid within that confined space tends to cause that fluid to migrate toward a space of greater volume, and therefore lesser pressure. Because the volume of the space between the rotor 128 and eccentric cylinder 92 increases as the angular distance from the apogee point 144 decreases, the volume of the adjacent fluid chamber or compartment 147 increases, and the fluid will tend to move in that direction if the rotor 128 is free to turn along the longitudinal axis 60. Consequently, pressure from fluid being injected into the first port 32 will propel the rotor in a clockwise direction as viewed in FIG. 9.

As the fluid and vanes pass the apogee point 144, the space between the eccentric cylinder 92 and the rotor 128 decreases. This decrease in volume would result in a proportionate increase in fluid pressure, which would produce a force directly opposing and offsetting the force which propels the rotor 128, unless that pressure is released. The pressure is released by venting that fluid through the second cylinder recess 124, second cylinder port 126, recesses 110, 118, and second flow passage 44, which together comprise the remaining segments of the channel 146. That fluid may also be withdrawn under a vacuum corresponding to the fluid pressure at the first port 32 to decrease the static resistance of the system. Reversing the flow of the fluid reverses the direction of rotation of the rotor 128. Increasing or decreasing the fluid pressure will proportionately increase or decrease the rate at which the rotor 128 rotates, and therefor its angular momentum.

Referring to FIG. 10, extending longitudinally outward from each end of the rotor 128 are rotor guide sleeves 148 which define a bore 150 extending entirely through each rotor guide sleeve 148 and the rotor 128 itself. Each rotor guide sleeve 148 is slidably received within a bearing 152. Each bearing 152 is comprised of an outer bearing track 154, and an inner bearing track 156 which is surrounded by the outer bearing track 154 and separated from the outer bearing track 154 by a gap 158. The surfaces of the outer bearing track 154 and inner bearing track 156 which are disposed towards and confront the gap 158 each contain a groove 160 which circles the entire bearing track 154, 156. The cross-section of the groove 160 defines a section of a circle whose diameter is equal to the greatest distance between the surface of the grooves 160 in the outer bearing track 154 and inner bearing track 156. A plurality of ball bearings 162 each having a diameter equal to that of the cross-section of the groove 160 are displaced within the gap 158 such that the ball bearings 162 contact the outer bearing track 154 and inner bearing track 156, and permit the inner bearing track 156 to revolve within the outer bearing track 154. One bearing 152 is received within a recess 164 of the bearing housing 114, while the other bearing 152 is received within the bearing sleeve 70.

A bushing ring 166 defining an aperture 168 having a diameter equal to that of the rotor guide sleeve 148, and a thickness equal to that of the end plates 78, 106 is disposed over each end plate 78, 106 between the central portion of the rotor 132 and the bearings 152. The end plates 78, 106 each define an aperture 170 having a diameter equal to the diameter of the bushing rings 166, and each end plate 78, 106 is placed over the rotor guide sleeves 148 and the bushing rings 166 received within the apertures 170. The end plate 106 is held in position and aligned with the bearing housing 114 by a pin 172 which is inserted through an alignment hole 174 in the end plate 106 and into a corresponding alignment hole 174 in the bearing housing 114. The bearing housing 114 is similarly held in position and aligned with the head cap 18 by an alignment pin 172a which is inserted into alignment holes 174a in the bearing housing 114 and head cap 18.

The rotor guide sleeve 148 nearest to the back cap 14 is fitted with a first drive sleeve 176 in the form of a sun gear projecting longitudinally backward from the rotor guide sleeve 148 and defining a bore 150 equal to and communicating with that of the rotor guide sleeves 148. The outer surface 178 of the first drive sleeve 176 contains projecting longitudinal ribs 180 similar to gear teeth. These ribs 180 may also take the form of helical screw threads or the like.

Referring to FIGS. 4 and 10, it can be seen that the first drive sleeve 176 is received within an equilateral array of three pinion gears 182, each pinion gear 182 being rotatably mounted on an axle 184 to a first planetary gear plate 186. The first planetary gear plate 186 is received within the ring gear 62. The inner surface 188 of the ring gear 62 is lined with longitudinal gear teeth 190 which mesh with the teeth 183 on each of the pinion gears 182. The first planetary gear plate 186 has a second drive sleeve 192 of a sun gear type similar in diameter and length to the first drive sleeve 176, extending longitudinally backward, and received within a second equilateral array of three pinion gears 182a, each gear being rotatably mounted on an axle 184a to a second planetary gear plate 194. The outer surface of the second drive sleeve 192 has longitudinal ribs or teeth 180a which mesh with the teeth 183a on the pinion gears 182a connected to the second planetary gear plate 194. The second planetary gear plate 194 has a linking drive sleeve 196 similar in diameter and length to the second drive sleeve 192 extending longitudinally backward, the outer surface of the linking drive sleeve being substantially smooth and not having ribs or gear teeth. Each planetary gear plate 194, 186, along with the pinion gears 182, 182a and axles 184, 184a attached to it, form a single planetary gear assembly which may rotate within the ring gear 62.

The linking drive sleeve 196 is received within an angular contact bearing 198 which is similar to the bearings 152 but having each component smaller in diameter, such that the angular contact bearing 198 is received within a recess 200 in the back cap 14. A thrust nut 202 having a thrust nut sleeve 204 equal in length and diameter to the linking drive sleeve 196 is inserted within the angular contact bearing 198 opposing and contacting the linking drive sleeve 196. The angular contact bearing 198 is held in position by a bearing lock ring 206 which is placed over the thrust nut 202, and pressure from the back cap plate 16 against the bearing lock ring 206 holds the angular contact bearing 198 firmly against the recess 200 in the back cap 14. The thrust nut 202, linking drive sleeve 196, and first and second planetary drive plates 194, 186 define a power screw bore 208 extending entirely through the center thereof. The power screw bore 208 is threaded along the inner surface of the thrust nut 202, linking drive sleeve 196, and first planetary drive plate 194. A power screw 210 having threads 212 along a region covering at least a portion of its outer surface is received within the power screw bore 208. The threads 212 of the power screw 210, or separate furrows near the back cap end 30, mesh with the threaded or furrowed inner surface of the thrust nut 202, linking drive sleeve 196, and first planetary drive plate 194.

The power screw 210 is held in fixed relation to the linking drive sleeve 196 on the second planetary gear plate 194 by a screw pin 214 which is inserted through a hole 216 extending entirely through the linking drive sleeve 196 and power screw 210. The thrust nut 202 is held in alignment with the power screw 210 and second planetary gear plate 194 by a keeper screw 217 which is inserted longitudinally in a keeper screw hole 218 formed between the contacting surfaces of the power screw 210 and thrust nut 202. In this manner the pinion gears 182, planetary gear plates 186, 194, drive sleeves 176, 192, 196, thrust nut 202, and screw pin 214 serve as the coupling means to mechanically connect the rotor 128 to the power screw 210, therefore transmitting and imparting the rotary motion of the rotor 128 to the power screw 210. The screw pin 214, back cap 14, back cap plate 16, thrust nut 202, and keeper screw 217 serve as a means to retain the power screw 210 from moving substantially linearly.

A cylinder rod 220 having a cylinder rod bore 222 with a diameter corresponding to that of the power screw 210, and a threaded segment 228 to mesh with the threads 212 of the power screw 210, is placed over the power screw 210. The cylinder rod 220 may extend back as far as the screw pin 214, although it has proven suitable to have the cylinder rod 220 extend back and terminate within the rotor 128. The power screw 210 and cylinder rod 220 each extend forward through the bore 150 in the rotor 128, and through the head cap 18. The head cap 18 defines an aperture 224 sufficient to permit the cylinder rod 220 to extend therethrough, as well as a rod bushing 226 which surrounds the cylinder rod 220. The rod bushing 226 has a smooth aperture 228 through which the cylinder rod 220 may slide, with the rod bushing 226 having a rim 230 corresponding to a recess 232 in the head cap plate 20, and with the rod bushing 226 being held in place by pressure from the head cap plate 20 against the rim 230.

A portion of the end 234 of the cylinder rod 220 extending into the rod bushing 226 may have external threads 236 upon which a coupler may be attached, the coupler being of a type designed to link the cylinder rod 220 to any other appropriate mechanical device. The eccentric cylinder 92 is aligned within the cylindrical shell 52 by a pin 238 which is inserted entirely through a hole 240 in the cylindrical shell 52 and extending partially into the eccentric cylinder 92. As shown in FIG. 4, the linear motion of the cylinder rod 220 is restrained by the rotor 128 at one end and rod bushing 226 at the other end.

In the manner described, a planetary gear train located at one end of the rotor 128 circumscribing the power screw 210 and cylinder rod 220 is formed. This planetary gear train transfers rotary motion from the rotor 128 to the power screw 210 along common linearly aligned longitudinal axes 60, 130, which in turn imparts linear motion to the cylinder rod 220 along a parallel and linearly aligned longitudinal axis 60.

As shown in FIGS. 11a-11f, the linear motion power cylinder 10 may be attached to a planar surface 32 using a variety of mounting techniques such as: centerline lug mounts 242, foot mounts 244, tie-rod mounts 246, or clevis mounts 248. The linear motion power cylinder 10 may also be mounted within an existing frame or machine using a flange 250 or trunnion type mount 252.

It is understood that this embodiment of the linear motion power cylinder comprising a rotor with movable vanes is only one of the workable configurations which may be employed. The rotor, eccentric cylinder, and vanes may be replaced by a convoluted cylinder and matching rotor, similar to that found in a Wankel-type rotary engine, in which the rotor would directly contact the inner surface of the cylinder. The straight vanes on the rotor may be replaced by helical vanes which move within helical slots, or the vanes may be fixed to the rotor and act as turbine blades. Although it would be more difficult to maintain the precision of the linear motion power cylinder, the pressurized fluid could be made to flow directly through the cylinder, using an actual fan turbine arrangement for the rotor. In some applications the power screw may have an internal bore with threads, and the cylinder rod would be received and contained within the power screw. The cylinder rod and power screw could both be threaded externally, with the cylinder rod being placed generally parallel to and in overlapping tangential engagement with the threads of the power screw, such that rotation of the power screw will cause linear motion of the cylinder rod. The cylinder rod, or the end of the power screw, could also be equipped with a single lateral thread or groove which would communicate with a series of threads, tracks, or grooves in the opposing contacting surface of the power screw or cylinder rod. In each of these embodiments, the vanes, blades, or the convoluted surface of the rotor each acts interchangeably as impeller means to impart rotary motion to the rotor.

In operation, as the fluid pressure causes the rotor 128 to rotate around the axis of rotation 130 at a particular rate, the first drive sleeve 176 rotates at the same rate. This rotation causes the pinion gears 182 attached to the first panetary gear plate 186 to rotate and travel in a circular orbit around the axis of rotation 130 and within the ring gear 62. This in turn causes the first panetary gear plate 186 to rotate at a rate slower than that of the rotor 128, the angular velocity of the first planetary gear plate being a function of the angular velocity of the rotor and the ratio of the diameter of the first drive sleeve 176 to the diameter of the pinion gears 182 The rotation of the first planetary gear plate 186 causes the second drive sleeve 192 to rotate at the same rate, in turn rotating the pinion gears 182a connected to the second planetary gear plate 194. The rotation of those pinion gears 182a within the ring gear 62 causes the second planetary gear plate 194 and linking drive sleeve 196 to rotate at a reduced angular velocity which is a function of the angular velocity of the second drive sleeve 192 and the ratio of the diameters of the second drive sleeve 192 and the pinion gears 182a.

In this manner, the angular velocity of the rotor may be reduced or stepped down such that the linking drive sleeve 196 rotates at a rate any times slower than the rotor 128. The rotation of the linking drive sleeve 196 is translated via the screw pin 214 to the power screw 210, which rotates in turn at the same angular velocity and in the same direction as the linking drive sleeve 196. The direction of rotation of the first planetary gear plate 186, the linking drive sleeve 196, and the power screw 210 is the same as for the rotor 128. If the diameters of the pinion gears 182 are equal, and the diameter of the first drive sleeve 176 and second drive sleeve 192 are equal, the formula for the rate of revolution for the power screw 210 as a function of the rate of revolution for the rotor 128 becomes:

$$R_{screw} = \frac{R_{rotor}}{[1 + (D_{internal} D_{sleeve})]^2}$$

in which R is revolutions per unit time, $D_{sleeve}$ is the external diameter of the drive sleeves 176, 192, and $D_{internal}$ is the diameter of the inner surface 188 of the ring gear 62.

The rotation of the power screw 210 causes the threads 212 to rotate. The rotating threads 212, which are in contact with the mating threads in the bore 222 of the segment 223 of cylinder rod 220, cause the cylinder rod 220 to move in a linear path. If the rotor 128, and therefore the power screw 210, turn in a clockwise direction as viewed from the head cap plate end 28 of the linear motion power cylinder 10, right hand threads on the power screw 210 will cause the cylinder rod 220 to move toward the head cap plate end 28, and extend further outward toward the viewer from the linear motion power cylinder 10. Reversing the direction of revolution for the rotor 128, or the direction of the threads 212 on the power screw 210, will reverse the direction of linear motion of the cylinder rod 220. The pressure of the fluid is therefore transformed into incremental and reversible linear motion of the cylinder rod 220.

The cylinder rod 220 will move linearly at a velocity given by the rate of revolution of the power screw 210 divided by the number of threads 212 per unit length on the power screw 210. The linear velocity of the cylinder rod 220 may be adjusted by altering the ratios of the diameter of the pinion gears 182 to the diameter of the surface 188 of the ring gear 62 or sleeves 176, 192, varying the number of threads 212 per unit length of the power screw 10, or changing the angular velocity of the rotor 128. The direction of the linear motion of the cylinder rod 220 may be reversed by changing the direction of fluid flow through ports 32 and 42, reversing the threads 212 on the power screw 210, or increasing the number of planetary gear assemblies which are utilized.

What is claimed is:

1. A linear motion power cylinder for selective activation by a fluid under pressure, said linear motion power cylinder comprising:

an outer cylindrical shell;

a cylinder contained within said outer shell, said cylinder defining a cylinder bore within said cylinder having an interior surface;

a first port and a second port located at opposite ends of said outer shell for selective connection to a source of pressurized fluid, said first and second ports being connected in fluid communication to the cylinder bore by fluid passage means extending generally longitudinally within said outer shell;

a rotor, said rotor having an axis of rotation, and said rotor being rotatably mounted within said cylinder bore such that said rotor may rotate about said axis of rotation, said cylinder and said rotor defining one or more fluid chambers between said cylinder and said rotor in fluid flow communication with said fluid passage means, said rotor further defining an aperture extending substantially longitudinally through said rotor and surrounding said axis of rotation;

impeller means mechanically associated with said rotor for imparting rotary motion thereto;

a power screw, said power screw being rotatably mounted and having a longitudinal axis of rotation, said power screw further having a threaded region containing one or more threads, said power screw extending substantially through said aperture in said rotor and being received substantially therein;

a cylinder rod, said cylinder rod being slidably mounted within said cylinder for linear movement along a longitudinal axis generally parallel to said axis of rotation of said power screw, said cylinder rod further having a threaded segment threadedly engaged with at least a portion of said threaded region on said power screw, such that rotation of said threaded region of said power screw will cause linear movement of said cylinder rod into and out of said aperture of said rotor such that said cylinder rod may be received substantially within said aperture;

coupling means mechanically connecting said rotor to said power screw, such that the rotary motion of the rotor is transmitted and imparted to said power screw causing said power screw and said threaded region on said power screw to rotate, whereby fluid may enter the cylinder bore through one of the ports and exit the cylinder bore through the other port, with pressure from the fluid within the cylinder bore causing the rotor to rotate about the axis of rotation, the rotation of the rotor being transmitted by the coupling means to the power screw causing the power screw to rotate; and said outer cylindrical shell, with said first and second ports therein, having overall dimensional specifications conforming substantially to the uniform dimensional specifications for fluid-actuated power cylinders assigned by the National Fluid Power Association, whereby said power cylinder may be compatibly interchanged with dimensional fluid power cylinders conforming to such dimensional specifications.

2. The linear motion power cylinder of claim 1 wherein the longitudinal axis of rotation of the power screw is aligned linearly with the longitudinal axis of rotation of the rotor.

3. The linear motion power cylinder of claim 2 wherein the power screw extends at least partially within the rotor.

4. The linear motion power cylinder of claim 3 wherein the power screw extends entirely through the rotor.

5. The linear motion power cylinder of claim 4 wherein the longitudinal axis of the cylinder rod is aligned linearly with the longitudinal axis of rotation of the power screw.

6. The linear motion power cylinder of claim 5 wherein the power screw extends at least partially within the cylinder rod.

7. The linear motion power cylinder of claim 1 further comprising:

retaining means within the linear motion power cylinder retaining the power screw against linear movement.

8. The linear motion power cylinder of claim 1 wherein said coupling means comprises:

at least one sun gear connected to and extending from said rotor, said sun gear having an axis of rotation and a plurality of gear teeth on an outer surface opposing said axis of rotation;

at least one planetary gear assembly having one or more planetary pinion gears receiving said sun gear therebetween, each said planetary pinion gear having a plurality of gear teeth engaging said teeth on said sun gear, said planetary pinion gears being rotatably mounted on a planetary gear plate, said planetary gear plate being rotatably mounted within a ring gear, with said planetary gear plate having an axis of rotation, said ring gear including an inner surface having a plurality of gear teeth engaging said gear teeth on said planetary gear plate, said power screw being received within at least a portion of said planetary gear plate; and locking means to mechanically connect the power screw to said section of said planetary gear plate within which the power screw is received.

9. The linear motion power cylinder of claim 8 wherein the power screw extends through the ring gear.

10. The linear motion power cylinder of claim 1 wherein the coupling means is located proximate to one end of the cylinder and is mechanically connected to one end of the rotor.

11. The linear motion power cylinder of claim 1 wherein the coupling means comprises a gear train.

12. The linear motion power cylinder of claim 11 wherein the gear train comprises a planetary gear train in circular configuration circumscribing the power screw.

13. The linear motion power cylinder of claim 11 wherein the gear train comprises a planetary gear train in which a plurality of pinion gears move in a circular path, the center of which coincides with said axis of rotation.

14. The linear motion power cylinder of claim 1 wherein the fluid is air.

15. The linear motion power cylinder of claim 1 further having dimensional specifications confirming substantially to the uniform dimensional specifications for fluid actuated power cylinders assigned by the National Fluid Power Association.

16. The linear motion power cylinder of claim 1 wherein:

said cylinder rod is extendable for linear movement beyond and open end on one end of said cylindrical shell; and thrust bearing means adjacent the opposite end of said cylindrical shell within which said power screw is supported adjacent to said coupling means.

* * * * *